UNITED STATES PATENT OFFICE.

AXEL CHRISTIAN ANDERSON, OF COPENHAGEN, DENMARK.

WATER-COLOR FOR CEILINGS AND THE LIKE.

No. 887,452.     Specification of Letters Patent.     Patented May 12, 1908.

Application filed November 27, 1907. Serial No. 404,098.

*To all whom it may concern:*

Be it known that I, AXEL CHRISTIAN ANDERSON, house-painter, a subject of the King of Denmark, residing at Copenhagen, Denmark, (whose postal address is Drejögade 2, Copenhagen, Denmark,) have invented new and useful Improvements in Water-Colors for Ceilings and the Like, of which the following is a specification.

This invention has for its object a dry water-color for painting, especially white-washing ceilings and the like. The paint here referred to is superior to the known water colors for the above mentioned and similar purposes, mainly by reason of its extremely simple manner of treatment and the good results it yields, and also by reason of its great keeping power and durability, before and after use respectively.

According to the present invention I provide a water-color consisting of a suitable pigment, an extract of so-called Irish moss or carrageen, alga found along the coasts of the Atlantic (sphærococcus crispus, chondrus crispus and the like) a suitable antiseptic such as boracic acid, and a saccharine substance. In certain cases a certain proportion of pipe clay or kaolin is added.

In preparing the color provided by my invention I preferably proceed as follows:— First a suitably thick jelly is prepared by slowly boiling the carrageen with water for about an hour and a half, and this hot jelly is strained from moss-fibers and any impurities, and while it is still hot, there is added thereto, during stirring, a suitable quantity of boracic acid or the like which is dissolved therein. A suitable quantity of saccharine substance is added to the mixture preferably at this point in the process of manufacture. Such saccharine substance may be sugar, syrup, beet molasses, or the like. Syrup or refined molasses is preferable to raw molasses. The reason for this is apparently that raw molasses contains considerable quantities of potassium salts which absorb water, and therefore are apt to stain the ceiling in spots and make the brush strokes visible. After the addition of the saccharine matter jelly is mixed with the powdered chalk, and after the mass has been sufficiently worked and thereby has become entirely uniform, it is dried by suitable means, preferably quite rapidly. After drying, it is ground into a grainy or powdery mass, and is then ready to be packed.

Experiments have shown that the following proportions are suitable for the preparation of the carrageen-jelly, 1 part by weight of carrageen to about 22 parts of water, which gives about 23 parts by weight of jelly. This may be mixed with about 40 parts by weight of chalk and ½ part of boracic acid. In case of the use of beet molasses as a saccharine substance, ⅓ part of the molasses should be added, or a somewhat larger quantity of syrup in case the latter is used. A small proportion of pipe clay or precipitated kaolin may be added in case that it is desired that the coat of color shall attain a harder condition.

When the color is to be used, it is simply mixed up with a little cold or hot water into a paste which is left standing for about 20 minutes, and then suitably diluted with cold water. The color is then ready for use and may be applied directly to a plastered ceiling, without any previous preparation of the latter. A ceiling previously painted with the color here referred to should be washed with water, before the new coat is applied. The color is extremely easy and pleasant to use, and it flows freely from the brush, keeps moist for a considerable time after the application, and may be distributed with entire uniformity. When drying, it assumes a pleasant velvety aspect, and being protected against injury from micro-organisms, insects and the like, it maintains itself unchanged on the ceiling until, in the course of time, it becomes blackened by smoke, dust and the like.

The proportion herein given may be varied within wide limits without departing from the invention. Instead of boracic acid, other suitable preservatives may be used, for instance alum or chromate of some alkali. Care should be used in selecting the preservative, having in view the fact that metallic vessels are usually employed for mixing, that the brushes are usually wrapped with metal wire and that ceiling hooks, etc. to which the color may be applied, are usually made of metal. A preservative which will not have a harmful effect in this respect should be used. Salicylic acid, for instance, is unsuitable, as it violently attacks the said parts and thereby partly destroys these and partly discolors the ceiling. Nor is borax suitable as the antiseptic medium, as experience shows that if this substance is added to the color, then a fine and voluminous powder will effloresce from the color and drop down, leaving innumerable fine pores in the ceiling, damaging the same.

The addition of a certain quantity of saccharine substance is very important. Such substance has the effect of increasing the binding power of the color, which is an advantage as carrageen's own binding power is rather small. Beside this, saccharine substances especially molasses tend to preserve the carrageen, and consequently to increase its ability to resist attacks from micro-organisms. Of course, any tinting pigment may be used if desired. This will usually be added at the working place.

It will be seen that my invention provides a color which is extremely valuable in that it is easily manufactured, very conveniently applied, and is exceedingly durable.

What I claim as my invention and desire to secure by Letters Patent, is—

1. A water color comprising a pigment, an extract of carrageen, a suitable antiseptic and a saccharine substance.

2. A water color consisting of the following substances in approximately the proportions by weight indicated; chalk 40 parts, 23 parts of carrageen jelly, containing one part of carrageen and 22 parts water, $\frac{1}{2}$ part of boracic acid and $\frac{1}{3}$ part of molasses.

3. A water color consisting of the following substances in approximately the proportion by weight indicated; chalk 40 parts, 23 parts of carrageen jelly, containing one part of carrageen and 22 parts water, $\frac{1}{2}$ part of boracic acid, $\frac{1}{3}$ part of molasses and a certain proportion of clay.

In witness whereof, I have hereunto signed my name in the presence of two subscribing witnesses.

ALEX. CHRISTIAN ANDERSON.

Witnesses:
A. ROVSING OLSEN,
JULIUS LEHMANN.